(12) United States Patent  
Yoshida (10) Patent No.: US 6,234,589 B1
(45) Date of Patent: May 22, 2001

(54) BRAKING FORCE CONTROL APPARATUS (75) Inventor: Hiroaki Yoshida, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/194,136

(22) PCT Filed: May 21, 1997

(86) PCT No.: PCT/JP97/01723

§ 371 Date: Jan. 11, 1999

§ 102(e) Date: Jan. 11, 1999

(87) PCT Pub. No.: WO97/45302

PCT Pub. Date: Dec. 4, 1997

(30) Foreign Application Priority Data

May 28, 1996 (JP) .................................... 8-133656

(51) Int. Cl.$^7$ ........................................ B60T 8/66
(52) U.S. Cl. .................. 303/157; 303/155; 303/113.4; 303/114.3
(58) Field of Search .................... 303/113.4, 125, 303/155, 115.2, 3, 10, 15, 20, 114.3, 114.1, 157, 158

(56) References Cited

U.S. PATENT DOCUMENTS

| | | |
|---|---|---|
| 5,158,343 | 10/1992 | Reichelt et al. . |
| 5,261,730 | 11/1993 | Steiner et al. . |
| 5,350,225 | 9/1994 | Steiner et al. . |
| 5,367,942 | 11/1994 | Nell et al. . |
| 5,427,442 | 6/1995 | Heibel . |
| 5,445,444 | 8/1995 | Rump et al. . |
| 5,492,397 | * 2/1996 | Steiner et al. ................. 303/157 |
| 5,496,099 | 3/1996 | Resch . |
| 5,499,866 | 3/1996 | Brugger et al. . |
| 5,513,906 | 5/1996 | Steiner . |

(List continued on next page.)

FOREIGN PATENT DOCUMENTS

| | | |
|---|---|---|
| 4028290 | 1/1992 | (DE) . |
| 0711695 | 5/1996 | (EP) . |
| 2282649 | 4/1995 | (GB) . |
| 2295209 | 5/1996 | (GB) . |
| 60-38238 | 2/1985 | (JP) . |
| 61-268560 | 11/1986 | (JP) . |
| 3-227766 | 10/1991 | (JP) . |
| 4-121260 | 4/1992 | (JP) . |
| 4-334649 | 11/1992 | (JP) . |
| 5-97022 | 4/1993 | (JP) . |
| 7-76267 | 3/1995 | (JP) . |
| 7-165038 | 6/1995 | (JP) . |
| 7-329766 | 12/1995 | (JP) . |
| 8-34326 | 2/1996 | (JP) . |
| 8-40229 | 2/1996 | (JP) . |
| 8-295224 | 11/1996 | (JP) . |
| WO96/06763 | 3/1996 | (WO) . |

*Primary Examiner*—Robert J. Oberleitner
*Assistant Examiner*—Devon Kramer
(74) *Attorney, Agent, or Firm*—Kenyon & Kenyon (57) ABSTRACT

A braking force control apparatus adapted to change a magnitude of a braking force produced in response to a braking operation based on a condition of the braking operation, and control a braking force in an appropriate manner meeting an operating feeling of a vehicle operator. The braking force control apparatus performs either a normal control to produce a braking force by a braking operation or a brake-assist control to produce an increased braking force larger than the braking force produced during the normal control. In the apparatus, a stroke sensor (299) detects a stroke amount (L) of a brake pedal (202). When a stroke amount (L) of the brake pedal (202) detected at a predetermined time ($T_{ST}$) after the normal control is changed to the brake-assist control is below a predetermined value ($\alpha$), the apparatus determines that a brake releasing operation is intended by the operator, and terminates the brake-assist control.

8 Claims, 5 Drawing Sheets

U.S. PATENT DOCUMENTS

| | | |
|---|---|---|
| 5,535,123 | 7/1996 | Rump et al. . |
| 5,549,369 | 8/1996 | Rump et al. . |
| 5,556,173 * | 9/1996 | Steiner et al. ............................ 303/3 |
| 5,564,797 | 10/1996 | Steiner et al. . |
| 5,567,021 | 10/1996 | Gaillard . |
| 5,584,542 * | 12/1996 | Klarer et al. ......................... 303/155 |
| 5,586,814 | 12/1996 | Steiner . |
| 5,658,055 * | 8/1997 | Dieringer et al. ................. 303/114.3 |
| 5,660,448 | 8/1997 | Kiesewetter et al. . |
| 5,669,676 * | 9/1997 | Rump et al. ......................... 303/125 |
| 5,719,769 | 2/1998 | Brugger et al. . |
| 5,720,532 * | 2/1998 | Steiner et al. ....................... 303/125 |
| 5,772,290 * | 6/1998 | Hiebel et al. ..................... 303/113.4 |

* cited by examiner

BRAKING FORCE CONTROL APPARATUS

FIELD OF THE INVENTION

The present invention generally relates to a braking force control apparatus, and more particularly to a braking force control apparatus which changes a magnitude of a braking force produced in response to a braking operation based on a condition of the braking operation.

BACKGROUND OF THE INVENTION

As disclosed in Japanese Laid-Open Patent Application No. 4-121260, there is known a braking force control apparatus which produces an increased braking force larger than a braking force during a normal control, when it is detected that an emergency braking operation is performed on an automotive vehicle. The conventional apparatus of the above publication is provided with a brake booster which produces a boosted pressure in response to a braking operation force Fp on a brake pedal of the vehicle, or the boosted pressure being equal to the braking operation force Fp multiplied by a given magnification factor. The boosted pressure is delivered from the brake booster to a master cylinder. The master cylinder produces a master cylinder pressure Pmc in response to the boosted pressure delivered from the brake booster, and the master cylinder pressure Pmc is proportional to the braking operation force Fp.

Further, the conventional apparatus of the above publication is provided with a high-pressure supplying unit having a pump which produces a brake-assist pressure. The high-pressure supplying unit produces a brake-assist pressure in accordance with a drive signal supplied by a control circuit. When a speed of the braking operation of the brake pedal exceeds a reference speed, it is determined that an emergency braking operation is performed by a vehicle operator, and the control circuit supplies a drive signal to the high-pressure supplying unit, the drive signal requesting a maximum brake-assist pressure to be produced by the high-pressure supplying unit. Both the brake-assist pressure produced by the high-pressure supplying unit and the master cylinder pressure Pmc produced by the master cylinder are supplied to a switching valve, and the switching valve delivers a larger one of the brake-assist pressure and the master cylinder Pmc to wheel cylinders of the vehicle.

In the conventional apparatus of the above publication, when the speed of the braking operation is below the reference speed, the master cylinder pressure Pmc, which is proportional to the braking operation force Fp, is supplied to the wheel cylinders. Hereinafter, the control that is performed to produce the braking force by the braking operation under such a condition will be called a normal control. On the other hand, when the speed of the braking operation is above the reference speed, the brake-assist pressure, which is produced by the high-pressure supplying unit, is supplied to the wheel cylinders. Hereinafter, the control that is performed to produce an increased braking force larger than the braking force produced during the normal control, under such a condition, will be called a brake-assist control.

In the conventional apparatus of the above publication, when the braking operation of the brake pedal is performed at a normal speed, the braking force is controlled to the magnitude that is proportional to the braking operation force Fp, and, when the emergency braking operation of the brake pedal is performed, the braking force is quickly increased to be larger than the braking force during the normal control.

In a certain running situation of the vehicle, the operator may perform a brake releasing operation of the brake pedal immediately after an emergency braking operation is performed. For example, when the vehicle comes into a situation that requires an emergency braking operation but the situation is shortly avoided, the operator tends to perform the brake releasing operation in such a situation.

In a case in which the brake releasing operation is performed by the operator immediately after the emergency braking operation is performed, the conventional apparatus of the above publication starts performing the brake-assist control at the time the emergency braking operation (the speed of which is above the reference speed) is performed. By the brake-assist control, the brake-assist pressure, larger than the brake fluid pressure produced during the normal control, is supplied from the high-pressure supplying unit to the wheel cylinders.

However, in the conventional apparatus of the above publication, during the brake-assist control, the increased brake fluid pressure is supplied from the high-pressure supplying unit to the wheel cylinders regardless of whether the stroke amount of the brake pedal is large or small. Hence, even after the brake releasing operation is performed by the operator, the conventional apparatus of the above publication continues to perform the brake-assist control. Although the situation that requires the emergency braking operation is avoided, the increased brake fluid pressure is continuously supplied to the wheel cylinders. An excessively large level of the braking force is continuously exerted on the vehicle in spite of the brake releasing operation, and this does not meet the operating feeling of the operator.

SUMMARY OF THE INVENTION

An object of the present invention is to provide an improved and useful braking force control apparatus in which the above-described problems are eliminated.

Another, more specific object of the present invention is to provide a braking force control apparatus which terminates the brake-assist control if the vehicle operator intends to release the braking operation force on the brake pedal after a start of the brake-assist control, in order to provide an appropriate braking force control to meet the operating feeling of the vehicle operator.

The above-mentioned objects of the present invention are achieved by a braking force control apparatus which performs either a normal control to produce a braking force proportional to a braking operation force or a brake-assist control to produce an increased braking force larger than the braking force produced during the normal control, characterized in that the apparatus includes: an operation quantity detection unit which detects a quantity of a braking operation of a brake pedal; and a first control termination judgment unit which terminates the brake-assist control when the quantity of the braking operation detected at a predetermined time after the normal control is changed to the brake-assist control is below a predetermined value.

The above-mentioned objects of the present invention are achieved by a braking force control apparatus which performs either a normal control to produce a braking force proportional to a braking operation force or a brake-assist control to produce an increased braking force larger than the braking force produced during the normal control, characterized in that the apparatus includes: an operation speed detection unit which detects a speed of a braking operation of a brake pedal; and a second control termination judgment unit which terminates the brake-assist control when the speed of the braking operation detected at a predetermined time after the normal control is changed to the brake-assist control is below a predetermined value.

A quantity of the braking operation of the brake pedal during the brake-assist control is produced by a sum of a quantity of the braking operation performed by the operator and a quantity of the braking operation performed by the brake-assist control. The quantity or the speed of the braking operation of the brake pedal during the brake-assist control vary depending on whether the brake pedal is depressed or released by the operator.

When the brake pedal is firmly depressed by the operator in a situation that requires the emergency braking operation, the quantity or the speed of the braking operation of the brake pedal detected during the brake-assist control becomes large. On the other hand, when the brake pedal is released by the operator in a situation that does not require the emergency braking operation, the quantity or the speed of the braking operation of the brake pedal detected during the brake-assist control becomes small. Hence, it is possible to determine whether a brake releasing operation is intended by the operator, by detecting the quantity or the speed of the braking operation of the brake pedal during the brake-assist control.

According to the braking force control apparatus of the present invention, it is possible to provide an appropriate braking force control to meet the operating feeling of the vehicle operator. The braking force control apparatus of the present invention detects the brake releasing operation intended by the operator with accuracy, and terminates the brake-assist control in an appropriate manner that meets the intention of the operator. Even when a brake releasing operation is performed by the operator immediately after an emergency braking operation, the braking force control apparatus of the present invention reliably terminates the brake-assist control, and it is possible for the braking force control apparatus of the present invention to achieve an appropriate braking force control to meet the operating feeling of the vehicle operator.

BRIEF DESCRIPTION OF THE DRAWINGS

Other objects, features and advantages of the present invention will be more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
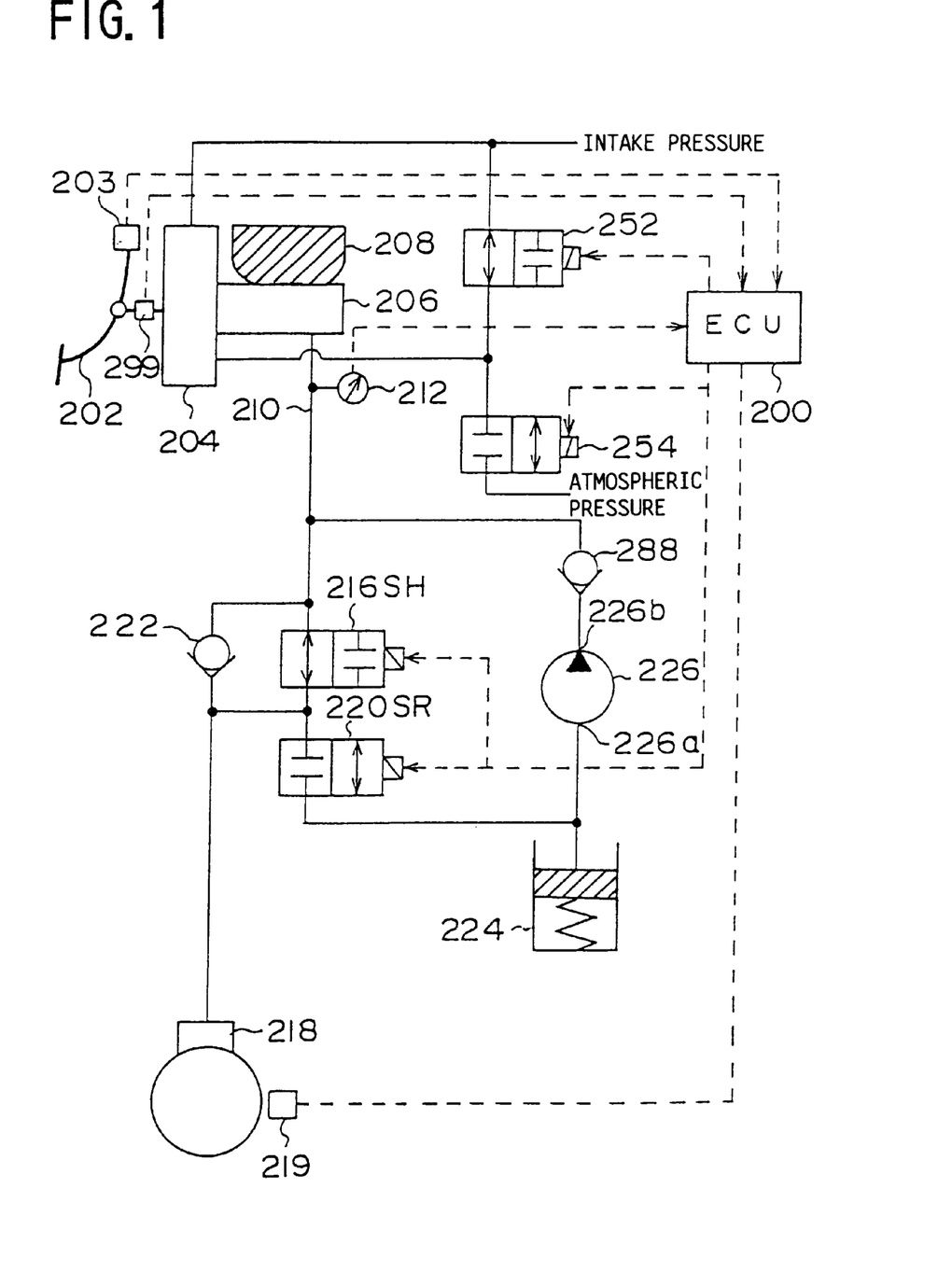
FIG. 1 is a diagram of one embodiment of a braking force control apparatus of the present invention.

By referring to FIG. 1 and FIG. 2, a description of one embodiment of the braking force control apparatus of the present invention will be given. FIG. 1 shows one embodiment of the braking force control apparatus of the present invention. For the sake of simplicity of description, a configuration of the braking force control apparatus having only one wheel cylinder provided for only one wheel of an automotive vehicle is illustrated in FIG. 1.

As shown in FIG. 1, the braking force control apparatus of the present embodiment is controlled by an electronic control unit 200 (hereinafter, called ECU 200). The braking force control apparatus of FIG. 1 includes a brake pedal 202. A brake switch 203 and a brake pedal stroke sensor 299 (which will be called the stroke sensor 299) are provided in the vicinity of the brake pedal 202. When the brake pedal 202 is depressed by the operator, the brake switch 203 outputs an ON signal to the ECU 200. The stroke sensor 299 outputs a stroke amount signal, indicating a stroke amount of the brake pedal 202, to the ECU 200. The ECU 200 determines whether the braking operation is performed by the operator, based on the signal output by the brake switch 203. The ECU 200 detects the stroke amount of the brake pedal 202 based on the stroke amount signal output by the stroke sensor 299.

The brake pedal 202 is connected to a vacuum booster 204. The vacuum booster 204 functions to increase the braking operation force of the brake pedal 202 by using an intake pressure of air into an internal combustion engine of the vehicle. Generally, the intake pressure is lower than the atmospheric pressure. A master cylinder 206 is fixed to the vacuum booster 204. When the brake pedal 202 is depressed by a normal braking operation force, a resultant force of the braking operation force Fp, exerted on the brake pedal 202, and a brake-assist force, produced by the vacuum booster 204, is transmitted from the vacuum booster 204 to the master cylinder 206. When the brake pedal 202 is depressed by an emergency braking operation force, a maximum brake-assist force produced by the vacuum booster 204 is transmitted to the master cylinder 206, regardless of the magnitude of the braking operation force Fp. A construction of the vacuum booster 204 will be described later.

The master cylinder 206 is fixed to the vacuum booster 204. The master cylinder 206 includes a pressure chamber provided therein. A reservoir tank 208 is provided on the top of the master cylinder 206. When the braking operation force on the brake pedal 202 is released by the operator, the reservoir tank 208 is connected to or communicates with the pressure chamber of the master cylinder 206. When the brake pedal 202 is depressed by the operator, the reservoir tank 208 is disconnected from or isolated from the pressure chamber of the master cylinder 206. Hence, the pressure chamber of the master cylinder 206 is replenished with brake fluid from the reservoir tank 208 every time the braking operation force on the brake pedal 202 is released by the operator.

A hydraulic pressure line 210 is connected to the pressure chamber of the master cylinder 206. A hydraulic pressure sensor 212 is provided at an intermediate portion of the pressure line 210. The hydraulic pressure sensor 212 outputs a signal, indicative of the master cylinder pressure Pmc, to the ECU 200. The ECU 200 detects the master cylinder pressure Pmc, produced in the master cylinder 206, based on the signal supplied by the hydraulic pressure sensor 212.

A pressure-holding solenoid 216 (hereinafter called SH 216) is provided in the pressure line 210. The SH 216 is a two-position solenoid valve which is normally set in a valve-open position so as to connect the master cylinder 206 to a wheel cylinder 218. When a drive signal is supplied to the SH 216 by the ECU 200, the SH 216 is set in a valve-closed position so as to disconnect the master cylinder 206 from the wheel cylinder 218.

The wheel cylinder 218 is connected on the downstream side of the SH 216 to the pressure line 210. A pressure-reducing solenoid 220 (hereinafter called SR 220) is also connected on the downstream side of the SH 216 to the pressure line 210. The SR 220 is a two-position solenoid valve which is normally set in a valve-closed position so as to inhibit a flow of the brake fluid from the wheel cylinder 218 into a downstream portion of the pressure line 210 via the SR 220. When a drive signal is supplied to the SR 220 by the ECU 200, the SR 220 is set in a valve-open position so as to allow the flow of the brake fluid from the wheel cylinder 218 into the downstream portion of the pressure line 210 via the SR 220. In addition, a check valve 222 is provided in a bypass line of the pressure line 210 around the SH 216, and the bypass line is connected to the wheel cylinder 218. The check valve 222 allows only a flow of the brake fluid from the wheel cylinder 218 into the pressure line 210, and inhibits a counter flow of the brake fluid from the pressure line 210 into the wheel cylinder 218.

A wheel speed sensor 219 is provided in the vicinity of the wheel of the vehicle in which the wheel cylinder 218 is provided. The wheel speed sensor 219 outputs a signal, indicative of a wheel speed of the vehicle, to the ECU 200. The ECU 200 detects the wheel speed of the wheel based on the signal supplied by the wheel speed sensor 219.

A reservoir 224 is connected to the pressure line 210 on the downstream side of the SR 220. When the SR 220 is set in the valve-open position, the brake fluid from the SR 220 flows into the reservoir 224, and stored in the reservoir 224. In the reservoir 224, a certain amount of brake fluid is initially stored. A pump 226 is provided in the pressure line 210, and has an inlet port 226a connected to the reservoir 224. The pump 226 has an outlet port 226b connected to a check valve 228 in the pressure line 210. The check valve 228 is connected to the upstream side of the SH 216 through the pressure line 210. The check valve 228 allows only a flow of the brake fluid from the outlet port 216b of the pump 226 into the upstream side of the SH 216 in the pressure line 210, and inhibits a counter flow of the brake fluid from the upstream side of the SH 216 to the outlet port 226b of the pump 226.

Next, a description of the construction of a vacuum booster provided in the braking force control apparatus of FIG. 1.

Figure 2:
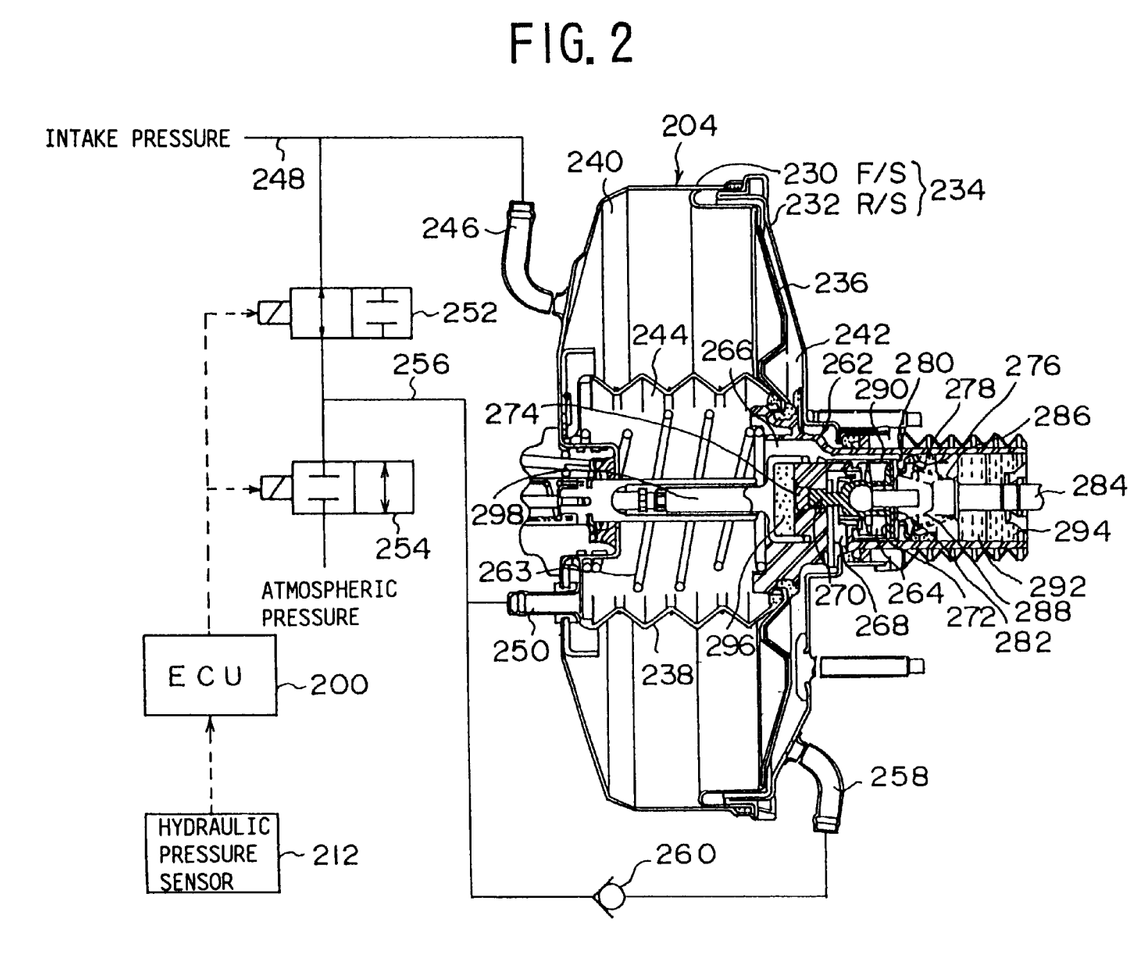
FIG. 2 is a diagram of a vacuum booster provided in the braking force control apparatus of FIG. 1.

FIG. 2 shows the vacuum booster 204 provided in the braking force control apparatus of FIG. 1. In FIG. 2, the master cylinder 206 is connected to the left-hand side of the vacuum booster 204, and the brake pedal 202 is connected to the right-hand side of the vacuum booster 204.

In the vacuum booster 204 of FIG. 2, a housing 234 including a front shell (F/S) 230 and a rear shell (R/S) 232 is provided. A diaphragm 236 and a cylindrical member 238 are provided inside the housing 234. The cylindrical member 238 is a cylindrical elastic part provided in a bellows-like formation. The cylindrical member 238 can expand or contract in its axial direction which is the right-to-left direction of FIG. 2. In an internal space of the housing 234, an intake pressure chamber 240, a first pressure-adjusting chamber 242 and a second pressure-adjusting chamber 244 are formed by the diaphragm 236 and the cylindrical member 238.

In the front shell 230 of the housing 234, an intake port 246 is provided, and the intake port 246 is connected to the intake pressure chamber 240 within the housing 234. An intake pressure line 248 is connected to the intake port 246 of the vacuum booster 204. An intake pipe of the engine or the like is connected to the intake pressure line 248, and an intake pressure from the intake pipe is delivered through the intake pressure line 248 to the vacuum booster 204. In the front shell 230 of the housing 234, a pressure adjusting port 250 is provided, and the pressure adjusting port 250 is connected to the second pressure-adjusting chamber 244 within the housing 234. A pressure adjustment line 256 is connected to the pressure adjusting port 250 of the vacuum chamber 204.

In the rear shell 232 of the housing 234, an atmospheric port 258 is provided, and the atmospheric port 258 is connected to the first pressure-adjusting chamber 242 within the housing 234. The pressure adjustment line 256 is connected through a check valve 260 to the atmospheric port 258 of the vacuum booster 204. The check valve 260 allows only a flow of the air from the pressure adjustment line 256 into the atmospheric port 258, and inhibits a counter flow of the air from the atmospheric port 258 of the vacuum booster 204 to the pressure adjustment line 256. Hence, when a pressure of the air in the pressure adjustment line 256, higher than a pressure of the air in the first pressure-adjusting chamber 242, is produced, the air flows into the atmospheric port 258 of the vacuum booster 204. The pressure adjustment line 256 is connected to both an intake pressure valve 252 and an atmospheric pressure valve 254.

The intake pressure valve 252 is provided between the intake pressure line 248 and the pressure adjustment line 256. The intake pressure valve 252 is a two-position solenoid valve which is normally set in a valve-open position (or an OFF state) so as to connect the intake pressure line 248 and the pressure adjustment line 256. When a drive signal is supplied to the valve 252 by the ECU 200, the valve 252 is set in a valve-closed position (or an ON state) so as to disconnect the pressure adjustment line 256 from the intake pressure line 248. The atmospheric pressure valve 254 is provided between the pressure adjustment line 256 and an atmospheric pressure line that is open to the atmosphere. The atmospheric pressure valve 254 is a two-position solenoid valve which is normally set in a valve-closed position (or an OFF state) so as to disconnect the pressure adjustment line 256 from the atmospheric pressure line. When a drive signal is supplied to the valve 254 by the ECU 200, the valve 254 is set in a valve-open position (or an ON state) so as to connect the pressure adjustment line 256 and the atmospheric pressure line.

The intake pressure chamber 240 is connected to the intake pressure line 248. When the vehicle is normally running, the intake pressure chamber 240 is held at a vacuum pressure of the intake pressure of the intake pressure line 248. The pressure adjusting chamber of the vacuum booster 204 is connected to the pressure adjustment line 256 through a valve device. The valve device is provided in the vacuum booster 204 to adjust an internal pressure of the pressure adjusting chamber in accordance with the braking operation of the brake pedal 202.

A booster piston 262 is fitted to the center of the diaphragm 236. The booster piston 262 is movably supported by the rear shell 232 such that one end of the booster piston 262 projects to the second pressure-adjusting chamber 244. A spring 263 is provided within the second pressure-adjusting chamber 244. The spring 263 exerts an actuating force on the booster piston 262 so as to push the booster piston 262 to an original position of the spring 262 in the right direction of FIG. 2.

In the middle of the booster piston 262, an internal space 264 is provided. Further, in the booster piston 262, an intake pressure passage 266 which connects the second pressure-adjusting chamber 244 and the internal space 264, and a pressure-adjusting passage 268 which connects the internal space 264 and the first pressure-adjusting chamber 242 are provided.

A braking operation force transmitting member 270 is provided in the internal space 264 of the booster piston 262, and the force transmitting member 270 is movably supported in an axial direction of the booster piston 262. The force transmitting member 270 includes an annular air valve 272 at a rear end of the booster piston 262, and a cylindrical force transmitting portion 274 at a front end of the booster piston 262.

Further, a control valve 276 is provided in the internal space 264 of the booster piston 262. The control valve 276 includes a cylindrical portion 278 and a plane portion 280. The cylindrical portion 278 is secured to an inside wall of the internal space 264 of the booster piston 262. The plane portion 280 is provided at a front end of the cylindrical portion 278. The plane portion 280 is movable within the internal space 264 of the booster piston 262 in an axial direction of the control valve 276 when the cylindrical portion 278 expands or contracts.

In the plane portion 280 of the control valve 276, a through hole 282 is provided in the center of the plane portion 280. An input rod 284 is inserted into the through hole 282 of the plane portion 280. The through hole 282 has a diameter that is adequately larger than a diameter of the input rod 284. Hence, there is an adequate clearance between the through hole 282 and the periphery of the input rod 284.

The input rod 284 is connected at its front end to the braking operation force transmitting member 270, and connected at its rear end to the brake pedal 202 shown in FIG. 1. A spring 286 is fixed at one end to the input rod 284, and fixed at the other end to the cylindrical portion 278 of the control valve 276. The spring 286 exerts an actuating force on the input rod 284 and the force transmitting member 270 so as to push the input rod 284 and the force transmitting member 270 toward the brake pedal 202 relative to the cylindrical portion 278. When no braking operation force is exerted on the input rod 284, the input rod 284 and the force transmitting member 270 are placed in a reference position, as shown in FIG. 2, by the actuating force of the spring 286.

Further, a spring 288 is fixed at one end to the input rod 284, and fixed at the other end to the plane portion 280 of the control valve 276. The spring 288 exerts an actuating force on the plane portion 280 so as to push the plane portion 280 toward the air valve 272.

When the force transmitting member 270 is placed in the reference position shown in FIG. 2, the actuating force of the spring 288 does not act on the plane portion 280 of the control valve 276, and only a force produced by the air valve 272 acts on the plane portion 280. When the force transmitting member 270 is placed in the reference position, the plane portion 280 is brought into contact with the air valve 272. The air valve 272 has a diameter that is adequately larger than the diameter of the through hole 282 of the control valve 276. Hence, when the force transmitting member 270 is placed in the reference position, the air valve 272 closes the through hole 282 of the control valve 276.

The booster piston 262 includes an annular valve seat 290 at a position confronting the plane portion 280 of the control valve 276. The valve seat 290 of the booster piston 262 is provided such that a clearance between the valve seat 290 and the plane portion 280 is created when the input rod 284 and the force transmitting member 279 are placed in the reference position. When the clearance between the valve seat 290 and the plane portion 280 is created, the intake pressure passage 266 is open to the internal space 264 of the booster piston 262. On the other hand, when the valve seat 290 is brought into contact with the plane portion 280 of the control valve 276, the intake pressure passage 266 is closed off or isolated from the internal space 264 of the booster piston 262.

In the internal space 264 of the booster piston 262, air filters 292 and 294 are provided at the rear end of the internal space 264. The internal space 264 of the booster piston 262 communicates with the atmosphere through the air filters 292 and 294. Hence, the atmospheric pressure is always introduced to the periphery of the through hole 282 of the control valve 276.

The booster piston 262 is connected at the front end to a reaction disk 296. The reaction disk 296 is a circular plate of an elastic material. An output rod 298 is connected to a front surface of the reaction disk 296 that is opposite to the booster piston 262. An input shaft of the master cylinder 206 shown in FIG. 1 is connected to the output rod 298. When a braking operation force is exerted on the brake pedal 202, a braking operation pressure proportional to the braking operation force is transmitted through the output rod 298 to the master cylinder 206. Meanwhile, a reaction to the master cylinder pressure Pmc of the master cylinder 206 acts on the reaction disk 296 through the output rod 298.

The reaction disk 296 confronts the force transmitting portion 274 of the force transmitting member 270. The force transmitting member 270 is provided such that, when the force transmitting member 270 is placed in the reference position relative to the booster piston 262, a clearance between the force transmitting member 270 and the reaction disk 296 is created.

Next, a description will be given of the operation of the vacuum booster 204 and the operation of the braking force control apparatus of the present embodiment. When an operating condition of the vehicle is found stable, the electronic control unit of the braking force control apparatus of the present embodiment performs the normal control in which a braking force proportional to the braking operation force Fp exerted on the brake pedal 202 is produced.

In the braking force control apparatus of the present embodiment, when the ECU 200 performs the normal control, the intake pressure valve 252 and the atmospheric pressure valve 254 are set in the OFF state. That is, the intake pressure valve 252 is set in the valve-open position, and the atmospheric pressure valve 154 is set in the valve-closed position. The intake pressure is supplied to the intake pressure chamber 240 of the vacuum booster 204, and the intake pressure is supplied to the second pressure-adjusting chamber 244. The operation of the vacuum booster 204 in this situation will now be described.

When no braking operation force Fp is exerted on the brake pedal 202, the input rod 284 and the force transmitting member 270 are placed in the reference position (shown in FIG. 2). In this case, the air valve 272 rests on the plane portion 280 of the control valve 276. The plane portion 280 is separated from the valve seat 290 of the booster piston 262, and the pressure adjusting passage 268 is isolated from the atmosphere and open to the intake pressure passage 266.

In the above-described situation, the first pressure-adjusting chamber 242 is open to the second pressure adjusting chamber 244. The internal pressure of the first pressure-adjusting chamber 242 is equal to the internal pressure of both the intake pressure chamber 240 and the second pressure-adjusting chamber 244. Hence, the force caused by the intake pressure does not act on the diaphragm 236, and, when no braking operation force Fp is exerted on the brake pedal 202, the output rod 298 does not act to press the master cylinder 206.

When the braking operation force Fp is exerted on the brake pedal 202 by the vehicle operator, the input rod 284 is moved relative to the booster piston 262 in the forward direction of the vehicle (or in the left direction of FIG. 2). When the movement of the input rod 284 to the booster piston 262 reaches a given distance, the end surface of the force transmitting portion 274 is brought into contact with the reaction disk 296. The plane portion 280 of the control valve 276 rests on the valve seat 290 of the booster piston 262. Hence, the intake pressure passage 266 is closed off or isolated from the pressure adjusting passage 268.

When the input rod 284 is further moved toward the reaction disk 296 under the above-mentioned situation, the input rod 284 and the force transmitting member 270 are moved in the forward direction of the vehicle while the central portion of the reaction disk 296 contacted by the force transmitting portion 274 is subjected to elastic deformation. In this manner, as the movement of the force transmitting member 270 is increased, a reaction to the elastic deformation of the reaction disk 296 is exerted on the input rod 284. The reaction exerted on the input rod 284 is proportional to the braking operation force Fp.

After the plane portion 280 of the control valve 276 rests on the valve seat 290, the increase of the movement of the plane portion 280 relative to the booster piston 262 is restricted. When the input rod 284 is further moved toward the reaction disk 296 from such a condition, the air valve 272 is separated from the plane portion 280 of the control valve 276. Hence, the pressure adjusting passage 268 is open to the atmosphere through the through hole 282.

When the pressure adjusting passage 268 is open to the atmosphere through the through hole 282, the atmospheric pressure is supplied through the through hole 282 and the pressure adjusting passage 268 to the first pressure-adjusting chamber 242. As a result, the internal pressure of the first pressure-adjusting chamber 242 is higher than the internal pressure of the second pressure-adjusting chamber 244 or the intake pressure chamber 240. As a difference dPa in the internal pressure between the first pressure-adjusting chamber 242 and the second pressure-adjusting chamber 244 (or the intake pressure chamber 240) is produced, a pressing force Fa (hereinafter, called a brake-assist force Fa) is exerted on the diaphragm 236 so as to push the diaphragm 236 in the forward direction of the vehicle.

The brake-assist force Fa, exerted on the diaphragm 236 in the above condition, is approximately represented by using an effective sectional area Sb of the intake pressure chamber 240 and an effective sectional area Sc of the second pressure-adjusting chamber 244, as follows.

$$Fa=(Sb+Sc)\cdot dPa$$

The above-described brake-assist force Fa is transmitted through the diaphragm 236 to the booster piston 262, and it is further transmitted to the peripheral portion of the reaction disk 296 at which the reaction disk 296 contacts the booster piston 262.

When the brake-assist force Fa is transmitted from the booster piston 262 to the peripheral portion of the reaction disk 296, the peripheral portion of the reaction disk 296 is subjected to elastic deformation. The elastic deformation of the peripheral portion of the reaction disk 296 increases as the difference dP in the internal pressure between both sides of the diaphragm 236 increases. That is, when the atmospheric pressure is continuously supplied to the first pressure-adjusting chamber 242, the elastic deformation of the reaction disk 296 increases.

When the elastic deformation of the peripheral portion of the reaction disk 296 is increasing, the booster piston 262 is moved in the forward direction of the vehicle relative to a reaction transmitting portion 28. When an amount of the elastic deformation of the peripheral portion of the reaction disk 296 is nearly equal to an amount of the elastic deformation of the central portion of the reaction disk 296, the plane portion 280 of the control valve 276 and the air valve 272 are placed in contact with each other. Hence, the supply of the atmospheric pressure to the first pressure-adjusting chamber 242 is stopped.

Consequently, the difference dP in the internal pressure between both sides of the diaphragm 236 is adjusted to a value that is proportional to the braking operation force Fp or the reaction exerted on the input rod 284. The brake-assist force Fa (=(Sb+Sc)·dPa) acting on the diaphragm 236 is also adjusted to a value that is proportional to the braking operation force Fp. At this time, a resultant force of the braking operation force Fp and the brake-assist force Fa is transmitted to the master cylinder 202.

When the resultant force of the braking operation force Fp and the brake-assist force Fa is transmitted to the master cylinder 202, the master cylinder 202 produces a master cylinder pressure Pmc that is equal to the braking operation force Fp multiplied by a given magnification factor.

When the operating condition of the vehicle is found stable, the ECU 200 of the braking force control apparatus of the present embodiment performs the normal control. During the normal control, the ECU 200 supplies no drive signals to the SH 216 and the SR 220, so that the SH 216 is set in the valve-open position and the SR 220 is set in the valve-closed position. When the hydraulic circuit related to the wheel cylinder 218 is placed in the above condition by the normal control, the master cylinder pressure Pmc from the master cylinder 206 is supplied to the wheel cylinder 218 through the SH 216. Hence, during the normal control, the wheel cylinder 218 produces a braking force on the vehicle wheel in accordance with the braking operation force Fp on the brake pedal 202.

When a slip ratio S of the vehicle wheel is found to be above a reference value after the braking operation is performed in the braking force control apparatus of the present embodiment, it is determined that ABS (anti-lock brake system) control execution conditions are satisfied. After this determination is made, the execution of the ABS control of the braking force control apparatus is started by the ECU 200. When the brake pedal 202 is depressed, or when the master cylinder pressure Pmc from the master cylinder 206 is increased to an adequately high pressure, the ABS control is achieved by the ECU 200. That is, during the ABS control, the ECU 200 starts the operation of the pump 226, and controls the drive signals supplied to the SH 216 and the SR 220 in the following in manner.

During the ABS control of the present embodiment, if the adequately increased master cylinder pressure Pmc is supplied by the master cylinder 206, the ECU may control the SH 216 and the SR 220 such that the SH 216 is set in the valve-open position and the SR 220 is set in the valve-closed position. When the ECU 200 performs this control procedure, the wheel cylinder pressure Pwc of the wheel cylinder 218 is increased up to the master cylinder pressure Pmc. Hereinafter, this control procedure will be called (1) a pressure-increasing control mode.

Alternatively, during the ABS control of the present embodiment, the ECU 200 may control the SH 216 and the SR 220 such that the SH 216 is set in the valve-closed position and the SR 220 is set in the valve-closed position. When the ECU 200 performs this control procedure, the wheel cylinder pressure Pwc of the wheel cylinder 218 is held at the same level without increase or decrease. Hereinafter, this control procedure will be called (2) a pressure-holding control mode.

Further, during the ABS control of the present embodiment, the ECU 200 may control the SH 216 and the SR 220 such that the SH 216 is set in the valve-closed position and the SR 220 is set in the valve-open position. When the ECU 200 performs this control procedure, the wheel cylinder pressure Pwc of the wheel cylinder 218 is decreased. Hereinafter, this control procedure will be called (3) a pressure-decreasing control mode.

In the braking force control apparatus of the present embodiment, the ECU 200 suitably performs one of (1) the pressure-increasing control mode, (2) the pressure-holding control mode and (3) the pressure-decreasing control mode so as to maintain the slip ratio S below the reference value, preventing the vehicle wheel from being locked during the braking operation.

It is necessary to quickly decrease the wheel cylinder pressure Pwc of the wheel cylinder 218 after the operator releases the braking operation force on the brake pedal 202 during the execution of the ABS control. In the braking force control apparatus of the present embodiment, the check valve 222 is provided in the bypass line connected to the wheel cylinder 218 so as to allow only the flow of the brake fluid from the wheel cylinder 218 into the master cylinder 206. As the check valve 222 functions in this manner, it is possible for the braking force control apparatus of the present embodiment to quickly decrease the wheel cylinder pressure Pwc after the operator releases the braking operation force on the brake pedal 202 during the execution of the ABS control.

During the ABS control by the braking force control apparatus of the present embodiment, the wheel cylinder pressure Pwc of the wheel cylinder 218 is suitably adjusted by supplying the master cylinder pressure Pmc from the master cylinder 206 to the wheel cylinder 218. When the brake fluid from the master cylinder 206 is delivered to the wheel cylinder 218, the wheel cylinder pressure Pwc is increased, and, when the brake fluid within the wheel cylinder 218 is delivered to the reservoir 224, the wheel cylinder pressure Pwc is decreased. If the increase of the wheel cylinder pressure Pwc is performed by using the master cylinder 206 as the only brake fluid pressure supplying unit, the brake fluid contained in the master cylinder 206 is gradually decreased through a repeated execution of the pressure-increasing control mode and the pressure-decreasing control mode.

However, in the present embodiment, the brake fluid contained in the reservoir 224 is returned back to the master cylinder 206 by the pump 226. Therefore, it is possible to prevent the master cylinder 206 from malfunctioning due to a too small amount of the brake fluid contained therein even when the ABS control is continuously performed over an extended period of time.

In the braking force control apparatus of the present embodiment, when any of the wheels of the vehicle is found to be shifted to a locked state, the execution of the ABS control of the braking force control apparatus is started. In order to start the execution of the ABS control, it is necessary that the braking operation force be exerted on the brake pedal, which is adequately large to produce a large slip ratio S related to any of the wheels of the vehicle.

Figure 3:
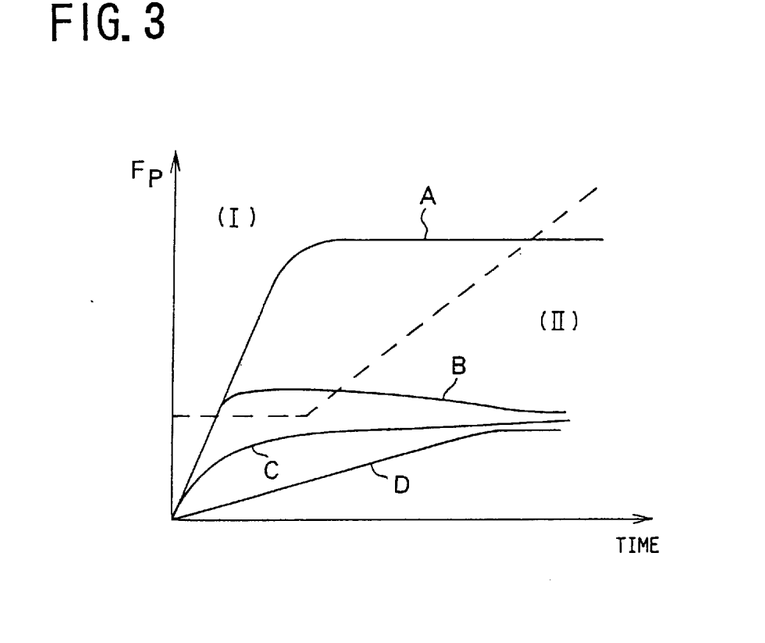
FIG. 3 is a diagram for explaining changes of a braking operation force on a brake pedal with respect to the elapsed time in various situations.

FIG. 3 shows changes of the braking operation force Fp on the brake pedal 202 with respect to the elapsed time in various situations. Changes of the braking operation force Fp exerted on the brake pedal 202 by an experienced vehicle operator who intends to perform an emergency braking operation, and changes of the braking operation force Fp exerted on the brake pedal 202 by a beginner who intends to perform the emergency braking operation, are indicated by the curve "A" and the curve "B" in FIG. 3, respectively. Generally, it is necessary that the braking operation force Fp during the emergency braking operation is large enough to start the execution of the ABS control of the braking force control apparatus.

As indicated by the curve "A" of FIG. 3, in the case of the experienced vehicle operator, when a condition requiring the emergency braking has occurred, the braking operation force Fp on the brake pedal 202 is quickly raised to an adequately large level, and the braking operation force Fp is maintained at the adequately large level over a certain period of time. In response to the braking operation of the brake pedal 202, an adequately large master cylinder pressure Pmc from the master cylinder 206 is supplied to the wheel cylinder 218, and the ABS control of the braking force control apparatus can be started.

However, as indicated by the curve "B" of FIG. 3, in the case of the beginner, when the condition requiring the emergency braking has occurred, the braking operation force Fp may not be maintained at the adequately large level over a certain period of time although the braking operation force Fp is initially raised to the adequately large level. Hence, in response to the braking operation of the brake pedal 202 by the beginner, an adequately large master cylinder pressure Pmc from the master cylinder 206 may not be supplied to the wheel cylinder 218, and the ABS control of the braking force control apparatus cannot be started.

Generally, beginners who are less experienced in vehicle operation tend to unintentionally release the brake pedal 202 during the emergency braking operation. In the braking force control apparatus of the present invention, a braking force control procedure is performed by the ECU 200 when a brake releasing operation of the brake pedal 202 is determined as being an intentional operation, and this braking force control procedure allows the adequately large master cylinder pressure Pmc of the master cylinder 206 to be supplied to the wheel cylinder 218 even if the braking operation force Fp is not raised to the adequately large level as indicated by the curve "B" in FIG. 3. Hereinafter, this braking force control performed by the ECU 200 will be called the brake-assist control.

Before starting the brake-assist control in the braking force control apparatus of the present invention, it is necessary to determine, with accuracy, whether a braking operation of the brake pedal 202 is intended to perform the emergency braking operation or not.

In FIG. 3, changes of the braking operation force Fp on the brake pedal 202 (which is intended to perform a normal braking operation) with respect to the elapsed time in various situations are indicated by the curves "C" and "D". As indicated by the curves "A" through "D", a rate of change of the braking operation force Fp during the normal braking operation is smaller than a rate of change of the braking operation force Fp during the emergency braking operation. In addition, a convergence value of the braking operation force Fp during the normal braking operation is smaller than that of the braking operation force Fp during the emergency braking operation.

The braking force control apparatus of the present invention takes account of the differences between the braking operation force Fp during the normal braking operation and the braking operation force Fp during the emergency braking operation as shown in FIG. 3. When a rate of change of the braking operation force Fp during an initial period of the braking operation is above a certain reference value and the braking operation force Fp is raised to an adequately large level (which falls within a region (I) above the borderline indicated by a dotted line in FIG. 3), the ECU 200 of the braking force control apparatus of the present invention determines that the braking operation of the brake pedal 202 is intended to perform the emergency braking operation.

On the other hand, when the rate of change of the braking operation force Fp during the initial period of the braking operation is not above the reference value, or when the braking operation force Fp is not raised to the adequately large level (which falls within a region (II) below the borderline indicated by the dotted line in FIG. 3), the ECU 200 of the braking force control apparatus of the present invention determines that the braking operation of the brake pedal 202 is intended to perform the normal braking operation.

In the braking force control apparatus of the present invention, the ECU 200 makes a determination as to whether a speed of the braking operation of the brake pedal 202 is above a reference speed, and makes a determination as to whether a quantity of the braking operation of the brake pedal 202 is above a reference quantity. In accordance with the results of the determinations, the ECU 200 can determine whether the braking operation of the brake pedal 202 is intended to perform the emergency braking operation or the normal braking operation.

In the braking force control apparatus of FIG. 1, the speed and the quantity of the braking operation of the brake pedal 202 are detected by using the master cylinder pressure Pmc as the parameter to define the braking operation speed or the braking operation quantity. The master cylinder pressure Pmc is detected by the ECU 200 based on the signal supplied by the hydraulic pressure sensor 212. The master cylinder pressure Pmc varies in proportion with the braking operation quantity, and a rate of change (dPmc) of the master cylinder pressure Pmc is in correspondence with the braking operation speed. Accordingly, before starting the brake-assist control, the braking force control apparatus of the present embodiment can determine, with accuracy, whether the braking operation of the brake pedal 202 is intended to perform the emergency braking operation or not.

Next, a description will be given of the operations of the braking force control apparatus of the present embodiment which are achieved by the ECU 200 when performing the brake-assist control.

When it is determined that the master cylinder pressure Pmc and the rate of change dPmc of the master cylinder pressure satisfy predetermined brake-assist control starting conditions, the ECU 200 starts the brake-assist control. The brake-assist control is started by the ECU 200 by supplying the drive signals to the intake pressure valve 252 and the atmospheric pressure valve 254. That is, the intake pressure valve 252 is set in the valve-closed position (or the ON state) and the atmospheric pressure valve 254 is set in the valve-open position (or the ON state) by the drive signals sent from the ECU 200.

The ECU 200 does not supply the drive signals to the valves 252 and 254 after the brake pedal 202 is depressed and before it is determined that the master cylinder pressure Pmc and the rate of change dPmc of the master cylinder pressure satisfy the predetermined brake-assist control starting conditions. In this condition, both the valves 252 and 254 are set in the OFF state. After it is determined that the brake-assist control starting conditions are satisfied, the ECU 200 sets the valves 252 and 254 in the ON state.

As described above, before the valves 252 and 254 are set in the ON state, the input rod 284 is moved in advance of the booster piston 262, the atmospheric pressure is supplied to the first pressure-adjusting chamber 242. In this condition, the control valve 280 rests on the valve seat 290, and the air valve 272 is separated from the control valve 276. The vacuum booster 204 in this condition produces the brake-assist force Fa which is represented by the formula: Fa=(Sb+Sc)·dPa.

When the valves 252 and 254 are set in the ON state under the above condition, the internal pressure of the first pressure-adjusting chamber 242 and the second pressure-adjusting chamber 244 is quickly increased to the atmospheric pressure. As a result, a difference dPair in the internal pressure between the first pressure-adjusting chamber 242 and the second pressure-adjusting chamber 244 is produced. A brake-assist force Fa', which is represented by the formula: Fa'=Sb·dPair, is exerted on the diaphragm 236 so as to push the diaphragm 236 in the forward direction of the vehicle.

The brake-assist force Fa' is transmitted from the diaphragm 236 to the booster piston 262, and it is further transmitted to the peripheral portion of the reaction disk 296. In addition, the braking operation force Fp exerted on the brake pedal 202 is transmitted to the reaction disk 296. Hence, a resultant force of the brake-assist force Fa' and the braking operation force Fp is transmitted to the master cylinder 206 by the vacuum booster 204.

In the braking force control apparatus of the present embodiment, the brake-assist control (which changes the brake-assist force Fa to the brake-assist force Fa') is started in a condition in which the braking operation force Fp is not increased to an adequately large force. That is, in a condition in which an adequately large brake-assist force Fa is not produced, the brake-assist control is started. Therefore, the brake-assist force Fa exerted on the booster piston 262 before the start of the brake-assist control is rapidly increased to the brake-assist force Fa' after the start of the brake-assist control.

When the brake-assist force Fa is rapidly increased as described above, the booster piston 262 is rapidly moved in the forward direction of the vehicle immediately after the start of the brake-assist control. When the booster piston 262 is rapidly moved, the control valve 276, which rested on the valve seat 290 before the start of the brake-assist control, is rapidly separated from the valve seat 290.

When the control valve 276 is separated from the valve seat 290, the first pressure-adjusting chamber 242 is open to the second pressure adjusting chamber 244. It can be assumed that the intake pressure is maintained in the second pressure-adjusting chamber 244 in this condition. After the start of the brake-assist control, the intake pressure from the second pressure-adjusting chamber 244 is supplied to the first pressure-adjusting chamber 242. As a result, the vacuum booster 204 may have a difficulty in quickly increasing the brake-assist force Fa to the brake-assist force Fa'.

However, in the vacuum booster 204 in the present embodiment, the atmospheric pressure is supplied to the second pressure-adjusting chamber 244 at the same time as the start of the brake-assist control. Hence, it is possible for the braking force control apparatus of the present embodiment to quickly increase the brake-assist force Fa even when the control valve 276 is separated from the valve seat 290 after the start of the brake-assist control.

The ECU 200 controls the hydraulic circuit, connected to the master cylinder 206, in the normal condition after the brake-assist control starting conditions are satisfied and before the ABS execution conditions are satisfied. The master cylinder pressure Pmc of the master cylinder 206 is supplied to the wheel cylinder 218. Hence, the wheel cylinder pressure Pwc of the wheel cylinder 218 is rapidly increased from a pressure corresponding to the resultant force "(Sb+Sc)·dPb+Fp" (before the start of the brake-assist control) to a pressure corresponding to the resultant force "Sb·dPair+Fp" (after the start of the brake-assist control).

Accordingly, when the emergency braking operation is performed, the braking force control apparatus of the present embodiment can quickly increase the wheel cylinder pressure Pwc in response to the emergency braking operation. According to the braking force control apparatus of the present embodiment, an increased braking force adequately larger than the braking operation force Fp is produced even if the emergency braking operation is performed by a beginner. Therefore, in the braking force control apparatus of the present embodiment, after the situation that requires the emergency braking has occurred, it is possible to quickly produce an increased braking force larger than that produced during the normal control, even if the operator is a beginner.

After the increased brake fluid pressure is supplied to the wheel cylinder 218, the increased braking force is produced on the vehicle, and a relatively large slip ratio S of the vehicle wheel is produced. It is determined that the ABS control execution conditions are satisfied. After this determination is made, the execution of the ABS control is started by the braking force control apparatus of the present embodiment. As described above, the ECU 200 suitably performs one of (1) the pressure-increasing control mode, (2) the pressure-holding control mode and (3) the pressure-decreasing control mode so as to maintain the slip ratio S of the vehicle wheels below the reference value, preventing all the vehicle wheels from being locked during the braking operation.

In the braking force control apparatus of the present embodiment, after the start of the brake-assist control, the master cylinder pressure Pmc is maintained at a pressure proportional to the resultant force "Sb·dPair+Fp" while the braking operation force Fp is exerted on the brake pedal 202.

However, when the vehicle operator intends to perform a brake releasing operation after the start of the brake-assist control, it is necessary to quickly terminate the brake-assist control and start the normal control. For this reason, it is necessary to determine with accuracy whether the vehicle operator intends to perform the brake releasing operation, based on the quantity of the braking operation of the brake pedal 202.

In the present embodiment, a stroke amount of the brake pedal 202 is detected as the quantity of the braking operation of the brake pedal 202, and the determination concerning the intention of the brake releasing operation by the vehicle operator is made based on the detected stroke amount of the brake pedal 202. The stroke amount of the brake pedal 202 is detected by the ECU 200 based on the stroke amount signal output by the stroke sensor 299.

Figure 4:
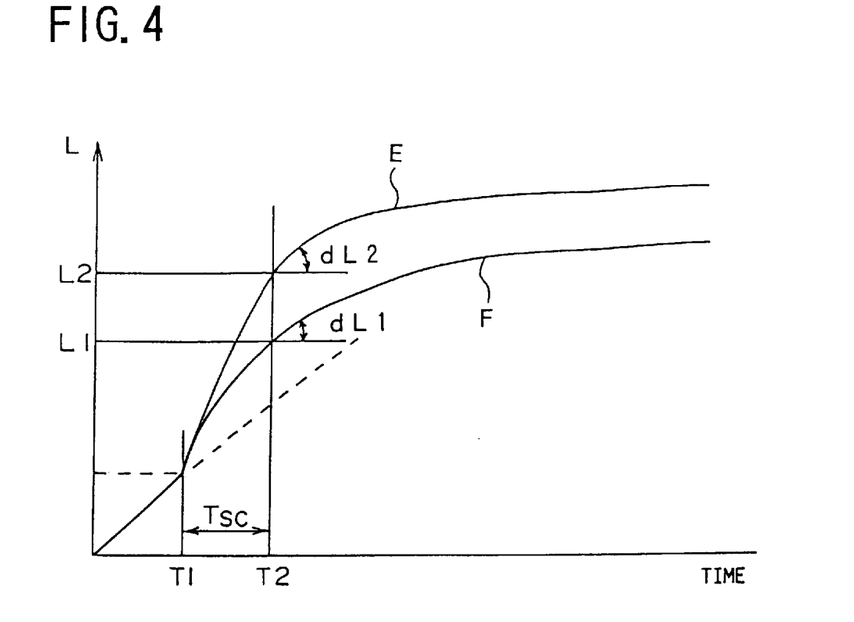
FIG. 4 is a diagram for explaining changes of a brake pedal stroke amount with respect to the elapsed time when a vehicle operator intends to perform an emergency braking operation and when the vehicle operator intends to perform a brake releasing operation.

FIG. 4 shows changes of a brake pedal stroke amount (L) with respect to the elapsed time when the vehicle operator intends to perform an emergency braking operation and when the vehicle operator intends to perform a brake releasing operation. Changes of the stroke amount L of the brake pedal 202 when the emergency braking operation is intended by the vehicle operator are indicated by the curve "E" in FIG. 4. Changes of the stroke amount L of the brake pedal 202 when the brake releasing operation is intended by the vehicle operator immediately after the start of the brake-assist control are indicated by the curve "F" in FIG. 4.

In FIG. 4, the detected stroke amount L of the brake pedal 202 is plotted along the vertical axis, and the elapsed time T is plotted along the lateral axis. For both the curves "E" and "F". Suppose that the braking force control of the ECU 200 is changed from the normal control to the brake-assist control at a time T1 indicated in FIG. 4.

In the example of the curve "E" in FIG. 4, the characteristic of the stroke amount L of the brake pedal 202 when the emergency braking operation is intended by the vehicle operator (or when the brake releasing operation is not intended) is illustrated. The brake pedal 202 is firmly depressed by the operator, and the stroke amount L of the brake pedal 202 in this example is produced by a sum of a stroke amount Lp of the brake pedal 202 by the braking operation by the vehicle operator and a stroke amount La of the brake pedal 202 performed by the brake-assist force Fa by the brake-assist control (L=La+Lp). As indicated by the curve "E" in FIG. 4, after the time T1 (or the start of the brake-assist control), the stroke amount L of the brake pedal 202 is rapidly increased.

In the example of the curve "F" in FIG. 4, the characteristic of the stroke amount L of the brake pedal 202 when the brake releasing operation is intended by the vehicle operator (or when the emergency braking operation is not intended) is illustrated. The brake pedal 202 is released by the operator, and the stroke amount L of the brake pedal 202 in this example is produced by only a stroke amount La of the brake pedal 202 performed by the brake-assist force Fa by the brake-assist control. As indicated by the curve "F" in FIG. 4, after the time T1 (or the start of the brake-assist control), the stroke amount L of the brake pedal 202 is less rapidly increased. In this manner, the changes of the stroke amount L of the brake pedal 202, detected during the brake-assist control, depend on whether the emergency braking operation is intended by the vehicle operator.

In the present embodiment, the difference between the characteristic of the curve "E" and the characteristic of the curve "F" at a time T2 (at which a predetermined time $T_{ST}$ has elapsed after the normal control is changed to the brake-assist control) is taken into consideration.

With respect to the quantity of the braking operation of the brake pedal 202, it is found from FIG. 4 that a stroke amount L1 of the brake pedal 202 at the time T2 in the case in which the brake releasing operation is intended (the curve "F") is smaller than a stroke amount L2 of the brake pedal 202 detected at the time T2 in the case in which the brake releasing operation is not intended (the curve "E"). That is, it is found that L1<L2. With respect to the speed of the braking operation of the brake pedal 202, it is found from FIG. 4 that a rate of change dL1 (or a gradient of the curve "F") of the stroke amount of the brake pedal 202 at the time T2 in the case of the curve "F" is smaller than a rate of change dL2 (or a gradient of the curve "E") of the stroke amount of the brake pedal 202 at the time T2 in the case of the curve "E". That is, it is found that dL1<dL2.

Accordingly, by detecting the stroke amount L of the brake pedal 202 (or the quantity of the braking operation) or the rate of change dL (or the speed of the braking operation)

of the stroke amount of the brake pedal 202 at the time T2, it is possible to accurately determine whether the vehicle operator intends to perform the brake releasing operation.

In the braking force control apparatus of the present embodiment, the determination as to whether the brake releasing operation is intended by the vehicle operator is made with accuracy by the above-described method. When it is determined that the brake releasing operation is intended, the braking force control apparatus of the present embodiment terminates the brake-assist control. Next, a description will be given of a braking force control process executed by the ECU 200 of the braking force control apparatus based on the above-described principle of the present invention.

Figure 5:
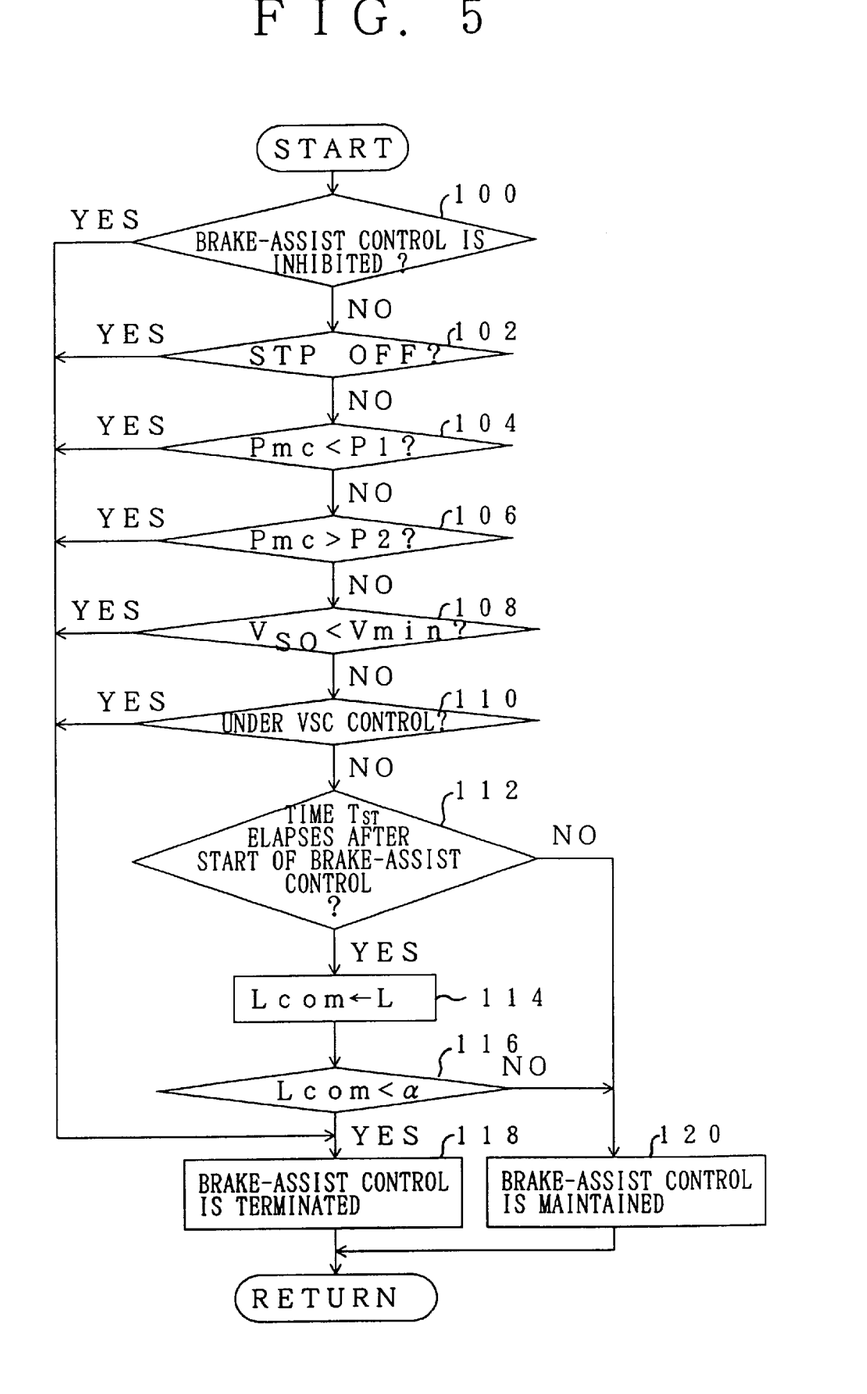
FIG. 5 is a flowchart for explaining a first embodiment of a braking force control process executed by the braking force control apparatus of FIG. 1.

FIG. 5 shows a first embodiment of the braking force control process executed by the ECU 200 of the braking force control apparatus of FIG. 1 in order to make a determination as to whether the brake-assist control should be terminated. The control process shown in FIG. 5 is an interrupt-initiated routine which is periodically initiated at intervals of a predetermined time.

In the control process of FIG. 5, steps 100 through 110 are performed to determine whether the brake-assist control is currently executed. As the control process of FIG. 5 is performed to determine whether the brake-assist control should be terminated, the performance of the control process of FIG. 5 is useless if the brake-assist control is not currently executed. Hence, before making a determination as to whether the brake-assist control should be terminated, the steps 100 through 110 are performed for this purpose.

As shown in FIG. 5, the ECU 200 at step 100 determines whether the execution of the brake-assist control is inhibited because of a malfunction in the braking force control apparatus. For example, when a break in a connection line between the ECU 200 and any of the brake switch 203, the hydraulic pressure sensor 212, the stroke sensor 299 and the wheel speed sensor 219 has occurred, the execution of the brake-assist control is inhibited. When the braking force control apparatus is malfunctioning, the brake-assist control cannot be properly performed. Therefore, when the result at the step 100 is affirmative, the ECU 200 at step 118 terminates the brake-assist control, and the subsequent steps of the control process are not performed.

When the result at the step 100 is negative, the ECU 200 at step 102 determines whether the brake switch 203 is in an OFF state based on the signal supplied by the brake switch 203. When the result at the step 102 is affirmative, the brake pedal 202 is not depressed by the operator. When the operator does not depress the brake pedal 202, it is not necessary to perform the brake-assist control in the braking force control apparatus. Therefore, when the result at the step 102 is affirmative, the ECU 200 at the step 118 terminates the brake-assist control, and the subsequent steps of the control process are not performed.

When the result at the step 102 is negative, the ECU 200 at step 104 determines whether the master cylinder pressure Pmc is smaller than a given reference pressure P1. The reference pressure P1 is preset to an adequately small value for the master cylinder pressure Pmc produced in the master cylinder 206 during the emergency braking operation of the brake pedal 202. When the master cylinder pressure Pmc is smaller than the reference pressure P1, it is not necessary to perform the brake-assist control in the braking force control apparatus. Therefore, when the result at the step 104 is affirmative, the ECU 200 at the step 118 terminates the brake-assist control, and the subsequent steps of the control process are not performed.

When the result at the step 104 is negative, the ECU 200 at step 106 determines whether the master cylinder pressure Pmc is larger than a given reference pressure P2. The reference pressure P2 is preset to an adequately large value for the master cylinder pressure Pmc produced in the master cylinder 206 when the emergency braking operation of the brake pedal 202 is performed by the beginner. The condition in which the master cylinder pressure Pmc is larger than the reference pressure P2 may result in when the emergency braking operation is performed by the experienced vehicle operator. In this condition, it is not necessary to perform the brake-assist control in the braking force control apparatus. Or, the condition in which the master cylinder pressure Pmc is larger than the reference pressure P2 may result in when a malfunction in the hydraulic pressure sensor 212 has occurred. In this condition, the brake-assist control cannot be properly performed in the braking force control apparatus. Therefore, when the result at the step 106 is affirmative, the ECU 200 at the step 118 terminates the brake-assist control, and the subsequent steps of the control process are not performed.

When the result at the step 106 is negative, the ECU 200 at step 108 determines whether an estimated vehicle speed Vso is smaller than a given low speed Vmin. The low speed Vmin is preset to an adequately small value for a vehicle speed at which the vehicle can be stopped without performing a sudden braking operation. The ABS control is performed in the braking force control apparatus in order to ensure a vehicle running stability even when the braking operation is suddenly performed by the operator. When the estimated vehicle speed Vso is smaller than the low speed Vmin, it is not necessary to perform the ABS control in the braking force control apparatus. Because of the same reasons, when the estimated vehicle speed Vso is smaller than the low speed Vmin, it is not necessary to perform the brake-assist control in the braking force control apparatus. Therefore, when the result at the step 108 is affirmative, the ECU 200 at the step 118 terminates the brake-assist control, and the subsequent steps of the control process are not performed.

When the result at the step 108 is negative, the ECU 200 at step 110 determines whether a VSC (vehicle stability control) is currently executed. A VSC system is provided in the vehicle to stabilize a running condition of the vehicle by preventing a skid of the vehicle caused by a change of a steering operation or a change of a road condition. The VSC includes a control process in which braking forces on the respective wheels of the vehicle are controlled independently. Executing the VSC and the ABS control in parallel is useless. In the present embodiment, the VSC is executed in preference to the ABS control, and, when the VSC is currently executed, the brake-assist control is not executed by the braking force control apparatus. Therefore, when the result at the step 110 is affirmative, the ECU 200 at the step 118 terminates the brake-assist control, and the subsequent steps of the control process are not performed.

When the result at the step 110 is negative, it is determined that the brake-assist control is currently executed in the braking force control apparatus. That is, when all the results of the steps 100 through 110 are negative, the ECU 200 determines that the brake-assist control is currently executed. Then, the ECU 200 performs the subsequent steps of the control process of FIG. 5 in order to make a determination as to whether the brake-assist control should be terminated.

The ECU at step 112 determines whether a predetermined time $T_{ST}$ has elapsed after a start of the brake-assist control (or the time T1 in the example of FIG. 4). The determination concerning the predetermined time T1 may be made by the ECU 200 by using a time counter that starts counting at the time the brake-assist control is started. When the result at the step 112 is negative, the predetermined time $T_{ST}$ has not elapsed after the start of the brake-assist control. In this condition, the ECU 200 at step 120 maintains the brake-assist control. After the step 120 is performed, the control process of FIG. 5 at the present cycle ends.

When the result at the step 112 is affirmative (or the predetermined time $T_{ST}$ has elapsed after the start of the brake-assist control), the ECU 200 at step 114 calculates a stroke amount L of the brake pedal 202 based on the stroke amount signal currently output by the stroke sensor 299, and stores the stroke amount L in a memory of the ECU 200 as a comparison stroke amount Lcom.

After the step 114 is performed, the ECU 200 at step 116 determines whether the comparison stroke amount Lcom, stored in the step 114, is smaller than a predetermined value α. In the step 116, the ECU 200 makes the determination as to whether the vehicle operator intends to perform the brake releasing operation, based on the stroke amount detected at the step 114. As described above with reference to FIG. 4, a stroke amount L1 of the brake pedal 202 detected at the time T2 in the case of the brake releasing operation being intended by the operator is smaller than a stroke amount L2 of the brake pedal 202 detected at the time T2 in the case of the brake releasing operation not being intended by the operator.

The value α, used in the step 116, is preset by experiments to be a threshold value of the stroke amount L which is accurate enough to determine whether the brake releasing operation is intended by the vehicle operator or not. Hence, by using the predetermined value α, it is possible to determine that the brake releasing operation is intended by the vehicle operator, when Lcom<α, and it is possible to determine that the brake releasing operation is not intended by the vehicle operator, when Lcom≧α.

The determination of the step 116 concerning the intention of the brake releasing operation by the vehicle operator is made at the predetermined time $T_{ST}$ after the start of the brake-assist control (when the result at the step 112 is affirmative). The time $T_{ST}$ is preset to be a time at which a difference between the comparison stroke amount Lcom and the predetermined value α is adequately detectable. By using the predetermined time $T_{ST}$, it is possible to increase the accuracy of the determination concerning the intention of the brake releasing operation by the vehicle operator.

When the result at the step 116 is negative, it is determined that the brake releasing operation is not intended by the vehicle operator. In this condition, the ECU 200 performs the step 120 in which the brake-assist control is maintained. On the other hand, when the result at the step 116 is affirmative, it is determined that the brake releasing operation is intended by the vehicle operator. In this condition, the ECU 200 performs the step 118 in which the brake-assist control is terminated. After the step 118 or the step 120 is performed, the control process of FIG. 5 at the present cycle ends.

According to the braking force control process of the present embodiment, it is possible to provide an appropriate braking force control to meet the operating feeling of the vehicle operator. The braking force control apparatus detects the brake releasing operation intended by the operator with accuracy, and terminates the brake-assist control in an appropriate manner that meets the intention of the vehicle operator. Even when a brake releasing operation is performed by the operator immediately after an emergency braking operation, the braking force control apparatus reliably terminates the brake-assist control, and it is possible for the braking force control apparatus to achieve an appropriate braking force control to meet the operating feeling of the vehicle operator.

Figure 6:
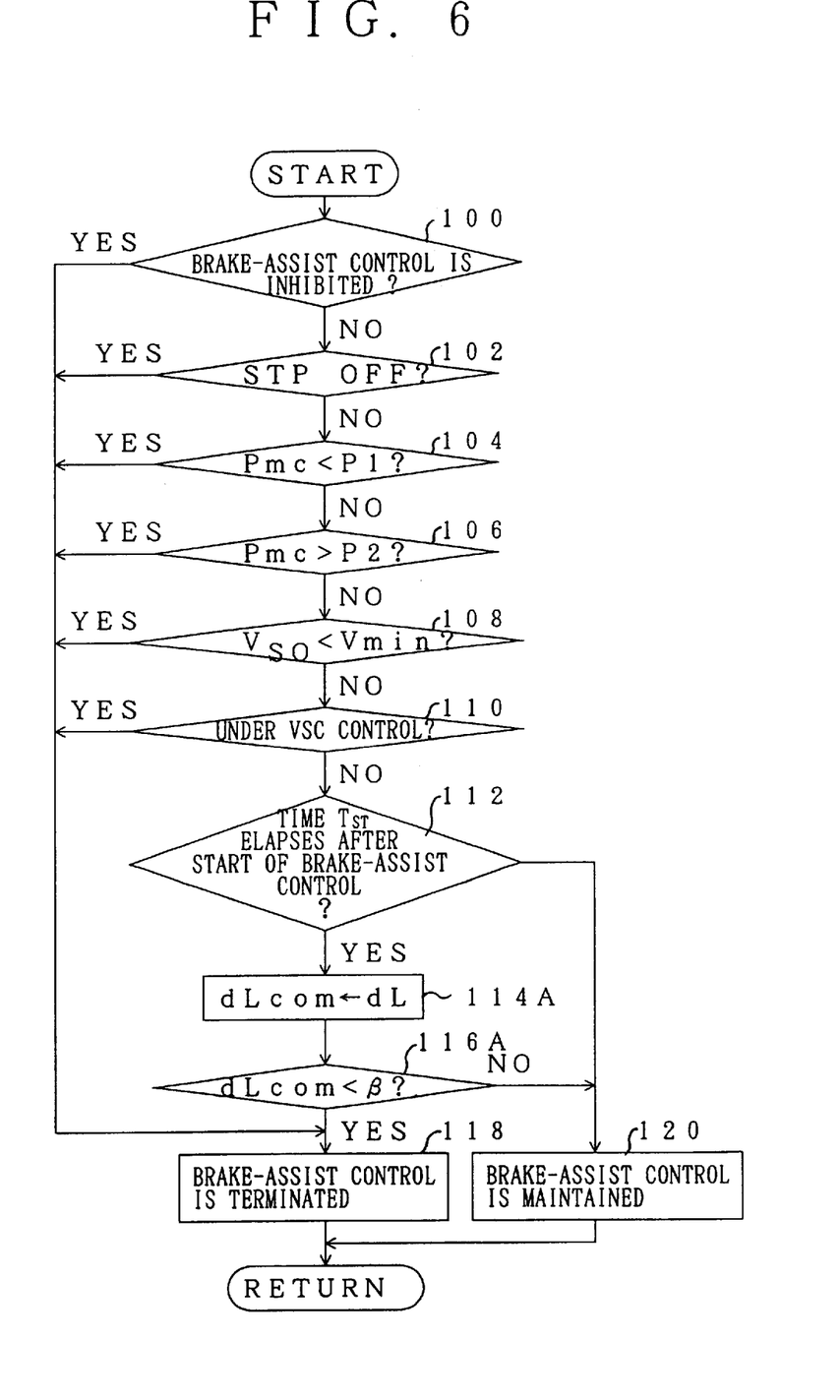
FIG. 6 is a flowchart for explaining a second embodiment of the braking force control process executed by the braking force control apparatus of FIG. 1.

Next, FIG. 6 shows a second embodiment of the braking force control process performed by the ECU 200 of the braking force control apparatus of FIG. 1 in order to make a determination as to whether the brake-assist control should be terminated. The control process shown in FIG. 6 is an interrupt-initiated routine which is periodically initiated at intervals of a predetermined time.

In FIG. 6, the steps which are the same as corresponding steps in FIG. 5 are designated by the same reference numerals, and a description thereof will be omitted.

In the control process of FIG. 6, only steps 114A and 116A are different from the corresponding steps in the control process of FIG. 5. As described above, in the control process of FIG. 5, a stroke amount L of the brake pedal 202 is detected at the predetermined time $T_{ST}$ after a start of the brake-assist control, and the determination as to whether the brake releasing operation is intended by the vehicle operator is made by comparing the detected stroke amount L and the predetermined value α.

As described above with reference to FIG. 4, a rate of change dL1 of the stroke amount of the brake pedal 202 at the time T2 in the case of the curve "F" (the brake releasing operation is intended) is smaller than a rate of change dL2 of the stroke amount of the brake pedal 202 at the time T2 in the case of the curve "E" (the brake releasing operation is not intended). Therefore, by detecting the rate of change dL (or the speed of the braking operation) of the stroke amount of the brake pedal 202 at the time T2, it is possible to accurately determine whether the brake releasing operation is intended by the vehicle operator.

In the braking force control process of the present embodiment, the determination as to whether the brake releasing operation is intended by the vehicle operator is made with accuracy by the above-described method. When it is determined that the brake releasing operation is intended, the braking force control apparatus of the present embodiment terminates the brake-assist control.

In the control process of FIG. 6, the ECU 200 at step 114A calculates a rate of change dL of the stroke amount of the brake pedal 202 based on the stroke amount signal currently output by the stroke sensor 299, and stores the rate of change dL in the memory of the ECU 200 as a comparison operation speed dLcom.

After the step 114A is performed, the ECU 200 at step 116A determines whether the comparison operation speed dLcom, stored in the step 114A, is smaller than a predetermined value β. In the step 116A, the ECU 200 makes the determination as to whether the vehicle operator intends to perform the brake releasing operation, based on the rate of change dL detected at the step 114A. As described above with reference to FIG. 4, a rate of change dL1 of the stroke amount of the brake pedal 202 detected at the time T2 in the case of the brake releasing operation being intended by the operator is smaller than a rate of change dL2 of the stroke amount of the brake pedal 202 detected at the time T2 in the case of the brake releasing operation not being intended by the operator.

The value β, used in the step 116A, is preset by experiments to be a threshold value of the rate of change of the brake pedal stroke amount which is accurate enough to determine whether the brake releasing operation is intended by the vehicle operator or not. Hence, by using the predetermined value β, it is possible to determine that the brake releasing operation is intended by the vehicle operator, when dLcom<β, and it is possible to determine that the brake releasing operation is not intended by the vehicle operator, when dLcom≧β.

According to the braking force control process of the present embodiment, it is possible to provide an appropriate braking force control to meet the operating feeling of the vehicle operator. The braking force control apparatus detects the brake releasing operation intended by the operator with accuracy, and terminates the brake-assist control in an appropriate manner that meets the intention of the vehicle operator. Even when a brake releasing operation is performed by the operator immediately after an emergency braking operation, the braking force control apparatus reliably terminates the brake-assist control, and it is possible for the braking force control apparatus to achieve an appropriate braking force control to meet the operating feeling of the vehicle operator.

In the above-described embodiments, by detecting the stroke amount L of the brake pedal 202 (or the quantity of the braking operation) or the rate of change dL (or the speed of the braking operation) of the stroke amount of the brake pedal 202 at the time T2, it is possible to determine whether the vehicle operator intends to perform the brake releasing operation. However, the base parameter on which the determination as to whether the brake releasing operation is intended by the vehicle operator is made is not limited to the brake pedal stroke amount L or the rate of change dL of the brake pedal stroke amount.

When the braking operation of the brake pedal 202 is performed, not only the brake pedal stroke amount L or the rate of change of the brake pedal stroke amount, but also the master cylinder pressure Pmc varies in accordance with the quantity of the braking operation. Further, when a braking force is exerted on the vehicle by performing the braking operation of the brake pedal 202, a deceleration G of the vehicle is also produced. By taking account of these factors, the determination as to whether the brake releasing operation is intended by the vehicle operator may be made based on any of the basic parameters including: (1) the stroke amount L of the brake pedal 202; (2) the rate of change dL of the stroke amount of the brake pedal 202; (3) the master cylinder pressure Pmc and a rate of change dPmc of the master cylinder pressure; (4) the deceleration G of the vehicle and a rate of change dG of the deceleration of the vehicle; (5) a rate of change dVso of the estimated vehicle speed Vso and a rate of change of the rate of change of the estimated vehicle speed; and (6) a rate of change dVw of the wheel speed Vw and a rate of change of the rate of change dVw. Further, in a case in which a hydraulic booster is used instead of the vacuum booster 204, the determination as to whether the brake releasing operation is intended by the vehicle operator may be made based on (7) a hydraulic pressure of the booster and a rate of change of the booster hydraulic pressure.

In the above-described embodiments, the present invention is applied to the braking force control apparatus of the type which controls the characteristic of the brake-assist force produced by the booster piston 204 between the master cylinder and the brake pedal. However, the present invention is not limited to the braking force control apparatus of the above type. For example, it is a matter of course that the present invention is applicable to a braking force control apparatus of a type in which a hydraulic booster is provided. In the braking force control apparatus of this type, an increased brake fluid pressure produced by a pump during the brake-assist control is delivered to an accumulator, and, by using the increased brake fluid pressure supplied from the accumulator, the hydraulic booster functions to produce a brake-assist pressure Pa so as increase the stroke amount of the braking operation of the brake pedal or the speed of the braking operation of the brake pedal.

According to the braking force control apparatus of the present invention, it is possible to provide an appropriate braking force control to meet the operating feeling of the vehicle operator. The braking force control apparatus of the present invention detects the brake releasing operation intended by the operator with accuracy, and terminates the brake-assist control in an appropriate manner that meets the intention of the operator. Even when a brake releasing operation is performed by the operator immediately after an emergency braking operation, the braking force control apparatus of the present invention reliably terminates the brake-assist control, and it is possible for the braking force control apparatus of the present invention to achieve an appropriate braking force control to meet the operating feeling of the vehicle operator.

Further, the present invention is not limited to the above-described embodiments, and variations and modifications may be made without departing from the scope of the present invention.

What is claimed is:

1. A braking force control apparatus which performs one of a normal control to produce a normal braking force proportional to a braking operation force and a brake-assist control to produce an assisted braking force larger than the normal braking force, the apparatus comprising:

operation amount detection means detecting a parameter associated with an amount of travel of a brake pedal; and first control termination judgment means terminating the brake-assist control when the operation amount parameter detected at a predetermined time after a change from the normal control to the brake-assist control falls below a predetermined value, wherein the first control termination judgment means maintains the brake-assist control until the predetermined time has elapsed.

2. The apparatus according to claim 1, further comprising determining means for determining whether the brake-assist control is currently being executed based on whether execution of the brake-assist control is currently permitted, wherein, when execution of the brake-assist control is currently permitted, the determining means determines that the brake-assist control is currently being executed.

3. The apparatus according to claim 1, further comprising determining means for determining whether the brake-assist control is currently being executed based on whether a brake switch is in an OFF state wherein, when it is determined that the brake switch is not in the OFF state, the determining means determines that the brake-assist control is currently being executed.

4. The apparatus according to claim 1, wherein the first control termination judgment means maintains the brake-assist control when the detected operation amount parameter is above the predetermined value.

5. A braking force control apparatus which performs one of a normal control to produce a normal braking force proportional to a braking operation force and a brake-assist control to produce an assisted braking force larger than the normal braking force, the apparatus comprising:

operation speed detection means detecting a speed of operation of a brake pedal; and first control termination judgment means terminating the brake-assist control when the the detected braking operation speed a predetermined time after a start of the brake-assist control is below a predetermined value, and wherein the first control termination judgment means maintains the brake-assist control until the predetermined time has elapsed regardless of the detected braking operation speed.

6. The apparatus according to claim 5, further comprising control execution judgment means (100) for determining whether the brake-assist control is currently being executed based on whether execution of the brake-assist control is currently permitted, wherein, when execution of the brake-assist control is currently permitted, the control execution judgment means determines that the brake-assist control is currently being executed.

7. The apparatus according to claim 5, further comprising determining means for determining whether the brake-assist control is currently being executed based on whether a brake switch is in an OFF state wherein, when it is determined that the brake switch is not in the OFF state, the determining means determines that the brake-assist control is currently being executed.

8. The apparatus according to claim 5, the first control termination judgment means maintains the brake-assist control when the detected braking operation speed is above the predetermined value.

* * * * *